G. O. BUCKLEY.
Improvement in Self Centering Chucks for Lathes.
No. 123,863. Patented Feb. 20, 1872.
Fig. 1.
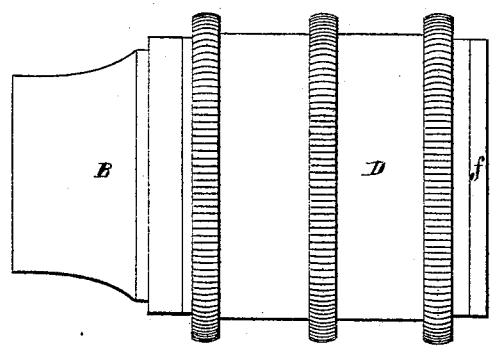
Fig. 2.
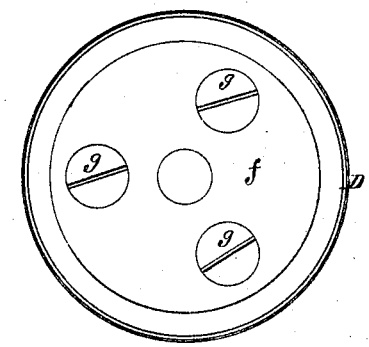
Fig. 3.
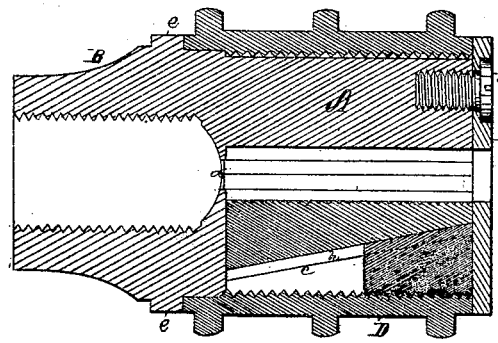
Fig. 4.
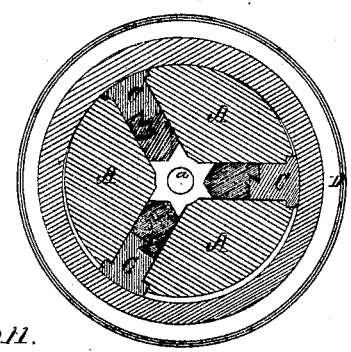
Fig. 5.
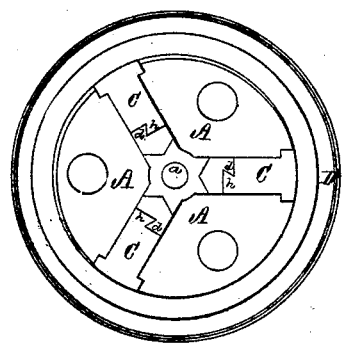
Fig. 11.
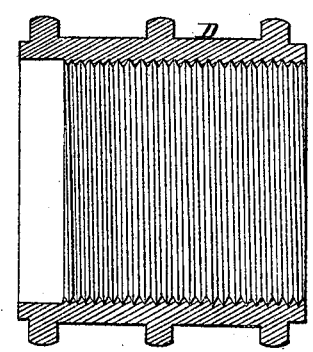
Fig. 12.
Fig. 9.
Fig. 7.
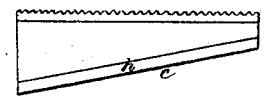
Fig. 6.
Fig. 8.
Fig. 10.
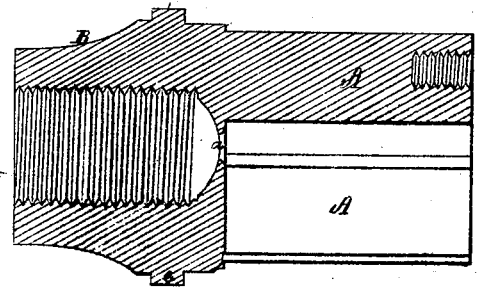
Witnesses
S. N. Piper
L. N. Möller
George O. Buckley
by his attorney
R. H. Eddy 123,863

UNITED STATES PATENT OFFICE.

GEORGE O. BUCKLEY, OF NEW BEDFORD, MASSACHUSETTS.

IMPROVEMENT IN SELF-CENTERING CHUCKS FOR LATHES.

Specification forming part of Letters Patent No. 123,863, dated February 20, 1872.

*To all persons to whom these presents may come:*

Be it known that I, GEORGE O. BUCKLEY, of New Bedford, of the county of Bristol, of the State of Massachusetts, have invented an Improved Self-Centering Chuck for Lathes; and do hereby declare the same to be fully described in the following specification, and represented in the accompanying drawing making part thereof, of which—

Figure 1 is a side elevation; Fig. 2 a front end view. Fig. 3 is a longitudinal section, and Fig. 4 a transverse section of it.

The chuck in question may be termed an improvement with reference to that for which Letters Patent No. 112,119, dated February 28, 1871, have been granted to me.

In my present chuck I have but one inclined plane or inclination to the outer edge of each jaw, and only one screw-wedge to operate each jaw; whereas, in my patented chuck I had two screw-wedges and two inclined planes to each radial jaw. In my present chuck as in the patented chuck, the sleeve has a rotary motion only in operating the jaws. It has no longitudinal motion, and is not screwed on the jaw-carrier as is the sleeve shown in the United States patent, No. 53,405. I use in my chuck the same number of screw-wedges as jaws, thereby dispensing with half the number as necessary to my patented chuck, each wedge being about half the length of its jaw, and the sleeve having but one internal screw. My improved construction and arrangement of parts, causes the article or chuck to have fewer parts, and to operate with less friction and wear, and to be made cheaper than my patented chuck.

In the drawing, A A A denote the three jaws arranged radially from a common center or axis, and within a carrier or cylindrical block B, such being so as to admit of each jaw being moved in a radial direction toward and from the axis of the block. Within the block is a central aperture, *a*, which opens through the cap *f*. In the rear of the block or jaw-carrier there may be a female screw for connecting the chuck to the male screw of the arbor of a lathe. Each jaw has its outer edge shaped as a single inclined plane, *c*, arranged as shown. Furthermore, there rests against such inclined plane or inclination, *c*, a single wedge, C, arranged therewith, in manner as represented, and projecting beyond the outer curved surface of the jaw-carrier, the said wedges being disposed within the radial slits *d*, for reception of the jaws. Encompassing the jaw-carrier, the series of wedges, and jaws, is the tube, hollow sleeve, or collar D, having a female screw cut on it from one end to the other of it, to engage with corresponding sections of male screws formed on the outer edges of the wedges. The collar or sleeve D is to revolve freely on the jaw-carrier, and at one end against a shoulder, *e*, thereof, and at the other against a cap-plate or disk, *f*, confined to the jaw-carrier by screws *g g g*. Furthermore, each jaw is dovetailed or interlocked with its wedge, in manner as shown at *h*, or so connected therewith as to be moved radially of the block in either direction by the wedge, while it may be in the act of being moved longitudinally by the screw-collar while the latter may be revolving. Each of the wedges is also dovetailed within the carrier, as shown at *i*.

Fig. 5 is a front end view of the chuck, as it appears with the cap-plate removed from the jaw-carrier. Fig. 6 denotes an end view, and Fig. 7 a side view of one of the jaws. Fig. 8 is an end view, and Fig. 9 a side view of one of the wedges. Fig. 10 is a longitudinal section, and Fig. 11 a front end view of the jaw-carrier. Fig. 12 is a longitudinal section of the collar.

By revolving the collar or sleeve D on the jaw-carrier, the wedges may be simultaneously moved rectilinearly in either direction, and being supported so that they cannot move radially, and being dovetailed or interlocked with the jaws they will cause them to have lateral or radial movements.

I herein make no claim to a chuck constructed as shown in either of the United States patents 48,259, 53,405, 112,119.

I claim—

My new or improved self-centering chuck, constructed as described viz., with the single series of radial screw-wedges to its inclined-plane jaws, with each jaw having but one inclined plane, and with the collar to screw upon each of the wedges, and so applied to the jaw-carrier as, when in operation, to have no longitudinal movement, but simply a rotary movement thereon, all being as described and shown.

GEO. O. BUCKLEY.

Witnesses:
R. H. EDDY,
J. R. SNOW.